(12) United States Patent
Otsuka (10) Patent No.: US 7,289,229 B2
(45) Date of Patent: Oct. 30, 2007

(54) OPTICAL DISPLACEMENT-MEASURING INSTRUMENT

(75) Inventor: Takanori Otsuka, Utsunomiya (JP)

(73) Assignee: Mitutoyo Corporation, Kawasaki (JP)

( * ) Notice: Subject to any disclaimer, the term of this patent is extended or adjusted under 35 U.S.C. 154(b) by 273 days.

(21) Appl. No.: 11/067,907

(22) Filed: Mar. 1, 2005

(65) Prior Publication Data

US 2005/0219546 A1    Oct. 6, 2005

(30) Foreign Application Priority Data

Mar. 12, 2004    (JP)   ............................. 2004-070608

(51) Int. Cl.
    *G01B 11/14*    (2006.01)
(52) U.S. Cl. ...................... 356/616; 356/614; 356/617; 356/618; 356/619; 33/706; 33/707; 250/237 G
(58) Field of Classification Search ................ 356/482, 356/485, 486, 614, 616–619; 250/237 G, 250/214.1; 33/706, 707
See application file for complete search history.

(56) References Cited

U.S. PATENT DOCUMENTS 4,518,859 A * 5/1985 Hoshika ................ 250/231.14
4,661,698 A    4/1987 Cappio et al.
5,841,133 A * 11/1998 Omi ...................... 250/231.13
6,410,911 B1 * 6/2002 Omi ...................... 250/231.13
6,526,190 B2 * 2/2003 Holzapfel et al. ............ 385/12

FOREIGN PATENT DOCUMENTS

JP    A 05-087594    4/1993
JP    A 2003-279383    10/2003

* cited by examiner

*Primary Examiner*—Jared J. Fureman
*Assistant Examiner*—Pedro A Rojas
(74) *Attorney, Agent, or Firm*—Oliff & Berridge, PLC (57) ABSTRACT

An optical displacement-measuring instrument of a reflection type includes a sensor head movable above a scale in a direction of measurement. This instrument is of a three-grating type that comprises a first optical grating arranged close to a light source, a second optical grating arranged on the scale, and a third optical grating arranged in a photoreceptor. A light diffuser is arranged between the light source and the first optical grating. A collimated light from the light source is diffused at the light diffuser and led to the first optical grating.

5 Claims, 10 Drawing Sheets

OPTICAL DISPLACEMENT-MEASURING INSTRUMENT

CROSS-REFERENCE TO RELATED APPLICATION

This application is based upon and claims the benefit of priority from the prior Japanese Patent Application No. 2004-70608, filed on Mar. 12, 2004; the entire contents of which are incorporated herein by reference.

BACKGROUND OF THE INVENTION

1. Field of the Invention

The present invention relates to an optical displacement-measuring instrument of a three-grating type.

2. Description of the Related Art

A displacement-measuring instrument such as an encoder has been employed in the art to precisely measure a linear displacement and an angular displacement. Such displacement-measuring instruments are classified into optical, inductive and capacitive types. Among those, an encoder of the optical type comprises a scale provided with an optical grating, and a sensor head movable above the scale, for example. The sensor head includes a light transmissive substrate arranged opposite to the scale and provided with an optical grating; a light source having a light emitting diode; and a photoreceptor having photodiodes.

When the sensor head is moved while the light emitting diode is turned on, the optical grating provided on the scale and the optical grating provided on the light transmissive substrate create a bright and dark pattern of light. This bright and dark pattern is detected at the photodiodes and converted into an electric signal. The amount of displacement can be calculated based on the signal.

The above-described encoder is of the so-called two-grating type that employs the optical grating provided on the scale and the optical grating provided on the light transmissive substrate. In the two-grating type, the smaller the gap between the optical grating on the scale and the optical grating on the light transmissive substrate (the gap between the optical gratings), the smaller the influences such as diffusion of light, and thus an improved resolution can be given to the encoder. A smaller gap between the optical gratings (for example, 10-50 µm), however, makes alignment of the scale with the light transmissive substrate difficult (worsens the alignment characteristic) and requires time and effort in assembly of the encoder. In addition, there is a natural limit of reduction in the gap between the optical gratings.

On the other hand, the so-called three-grating type disclosed in JP-A 2003-279383, FIG. 9, includes a further optical grating (first optical grating) arranged between the light source and the scale. The light from the light source is diffracted at the first optical grating and the diffracted light is diffracted at an optical grating (second optical grating) provided on the scale to create interference fringes, which are received at the photoreceptor through a third optical grating. The interference fringes has an intensity distribution, which is known to have no dependence on the gaps between the optical gratings (the gap between the first and second optical gratings and the gap between the third and second optical gratings). Therefore, the three-grating type is possible to have a larger gap between the optical gratings compared to the two-grating type. Accordingly, the three-grating type is easier to achieve the above alignment (has a better alignment characteristic) compared to the two-grating type.

JP-A 5-87594 discloses an optical encoder in FIG. 1, which includes a mask arranged between a light emitting source and a code plate having slits arranged at a certain interval. An opening is formed through the mask. The opening is operable as an aperture and is not a diffraction grating. Therefore, this encoder fails to correspond to such the three-grating type as described in this specification.

BRIEF SUMMARY OF THE INVENTION

Even a possible larger gap between the optical gratings makes the alignment difficult (worsens the alignment characteristic) if a smaller tolerance is given on deflection from a design value of the gap.

The present invention has an object to provide an optical displacement-measuring instrument capable of achieving an improvement in the alignment characteristic.

The present invention provides an optical displacement-measuring instrument, which comprises a light source configured to provide a collimated light: a light diffuser arranged to diffuse the collimated light from the light source; a first optical grating arranged to diffract a diffused light from the light diffuser: a scale having a second optical grating arranged opposite to the first optical grating to diffract a diffracted light from the first optical grating; and a photoreceptor movable together with the light source, the light diffuser and the first optical grating relative to the scale and having a third optical grating arranged opposite to the second optical grating to receive a diffracted light from the second optical grating.

In the optical displacement-measuring instrument according to the present invention, the light diffuser is provided to diffuse the collimated light from the light source. Then, the light diffused at the diffuser is led to the first optical grating. Therefore, a larger tolerance can be given on deflection from a design value of the gap between the optical gratings. In this case, the light diffuser may be configured to include a light diffusive plate. Alternatively, it may be configured to include a prism.

The optical displacement-measuring instrument according to the present invention may further comprises a light transmissive substrate arranged to support the first and third optical gratings at locations facing one surface of the scale. In this case, the first and second optical gratings may have a gap of 1.5 mm or less therebetween, and the third and second optical gratings may have a gap of 1.5 mm or less therebetween. This is an example of the present invention applied to an optical displacement-measuring instrument of the reflection type.

The optical displacement-measuring instrument according to the present invention may further comprises a semiconductor chip including the photoreceptor and attached by flip-chip bonding to a light transmissive substrate; and an underfill material arranged to fill a gap between the semiconductor chip and the light transmissive substrate and fix the light diffuser on the light transmissive substrate.

Thus, in the step of filling the underfill material into the gap between the semiconductor chip and the light transmissive substrate, the light diffuser can be fixed on the light transmissive substrate. As a result, it is possible to simplify the process steps of manufacturing the optical displacement-measuring instrument.

DETAILED DESCRIPTION OF THE INVENTION

An optical displacement-measuring instrument according to the embodiment will now be described with reference to the drawings. The same parts as those denoted with the reference numerals already described in the figures are given the same reference numerals to omit duplicated descriptions thereof.

Figure 1:
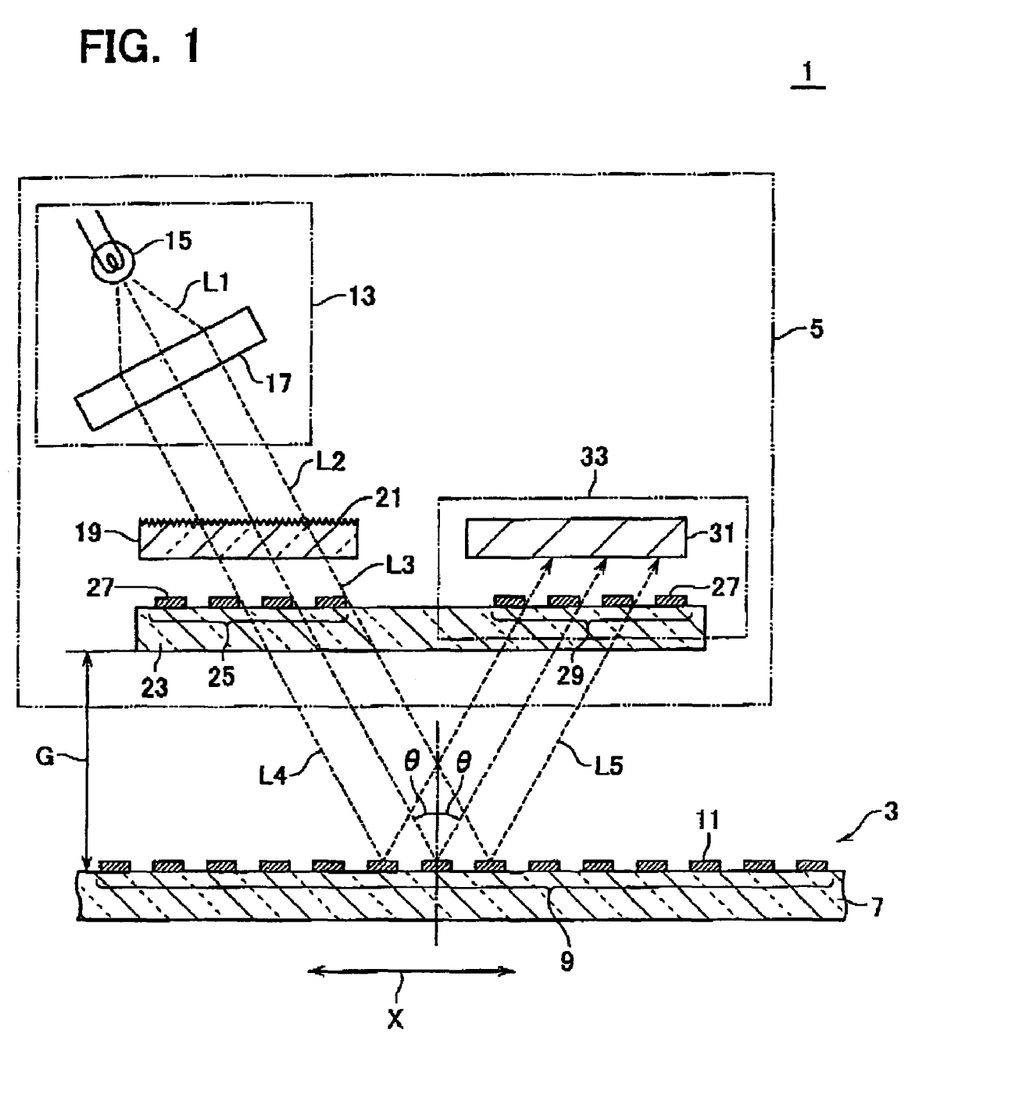
FIG. 1 is a cross-sectional view showing the principle of an optical displacement-measuring instrument of the reflection type according to the embodiment.

FIG. 1 is a cross-sectional view showing the principle of the optical displacement-measuring instrument 1 according to the embodiment. A specific example of the instrument 1 includes an optical encoder such as a linear scale. This embodiment is primarily characterized in that a light diffuser is arranged between a light source and a first optical grating in the three-grating type.

A configuration of the optical displacement-measuring instrument 1 is described first. The instrument 1 comprises a scale 3 and a sensor head 5. The scale 3 includes an elongated transparent substrate 7 composed of a transparent material such as glass, part of which is shown in FIG. 1. A second optical grating 9 or diffraction grating is formed on a surface of the transparent substrate 7 facing the sensor head 5. The second optical grating 9 has a plurality of light reflective portions 11 arranged in linear at a certain pitch (of 20 μm, for example) such that the light reflective portions 11 extend in the direction of depth in the figure. The light reflective portions 11 may be composed of a metal (such as chromium). The longitudinal direction of the scale 3 provides a measurement axis X.

The sensor head 5 is arranged against the scale 3 through an air gap and movable along the measurement axis X. The sensor head 5 comprises a light source 13. The light source 13 includes a light emitting diode (LED) 15, and a collimator lens 17 that collimates a light L1 emitted from the light emitting diode 15 to provide a collimated light L2 from the light source 13. The light source 13 is arranged such that the collimated light L2 is radiated to the scale 3 in an oblique direction. A laser (LD) may be employed instead of the light emitting diode 15.

The sensor head 5 also comprises a light diffuser 19 that diffuses the collimated light L2 emitted from the light source 13. The light diffuser 19 is composed of a transparent material such as glass and plastic. The light diffuser 19 is shaped in a plate or a sheet and has an upper surface 21 with fine recesses and projections formed thereon, which receives the collimated light L2 radiated from the light source 13. The recesses and projections diffuse the collimated light L2. When shapes of the recesses and projections on the light diffuser 19 have dimensions of the same order as the wavelength of light, a much better diffusion can be achieved.

The sensor head 5 further comprises a light transmissive substrate 23, which is provided between the light diffuser 19 and the scale 3 and arranged opposite to the scale 3. This substrate 23 is composed of glass, for example. On one surface of the light transmissive substrate 23, which is opposite to the other surface thereof that faces the scale 3, a first optical grating 25 or diffraction grating is provided opposite to the second optical grating 9. The first optical grating 25 has a plurality of opaque portions 27 arranged in linear at the same pitch as that of the light reflective portions 11 on the second optical grating 9 such that the opaque portions 27 extend in the direction of depth in the figure. The opaque portions 27 may be composed of a material of chromium.

On the surface of the light transmissive substrate 23 having the first optical grating 25 formed thereon, a third optical grating 29 is provided opposite to the second optical grating 9. Accordingly, the light transmissive substrate 23 supports both the first and third optical gratings 25, 29 at locations facing one surface of the scale 3. The third optical grating 29 is similar in structure to the first optical grating 25. A photodiode 31 is arranged opposite to the third optical grating 29. The photodiode 31 and the third optical grating 29 configure the photoreceptor 33. A phototransistor may be employed instead of the photodiode 31.

The optical displacement-measuring instrument 1 is configured to allow the sensor head 5 to move along the measurement axis X while the scale 3 is fixed. This embodiment is applicable to an inverse relationship. In a word, the photoreceptor 33 is movable together with the light source 13, the light diffuser 19 and the first optical grating 25 relative to the scale 3.

Figure 2:
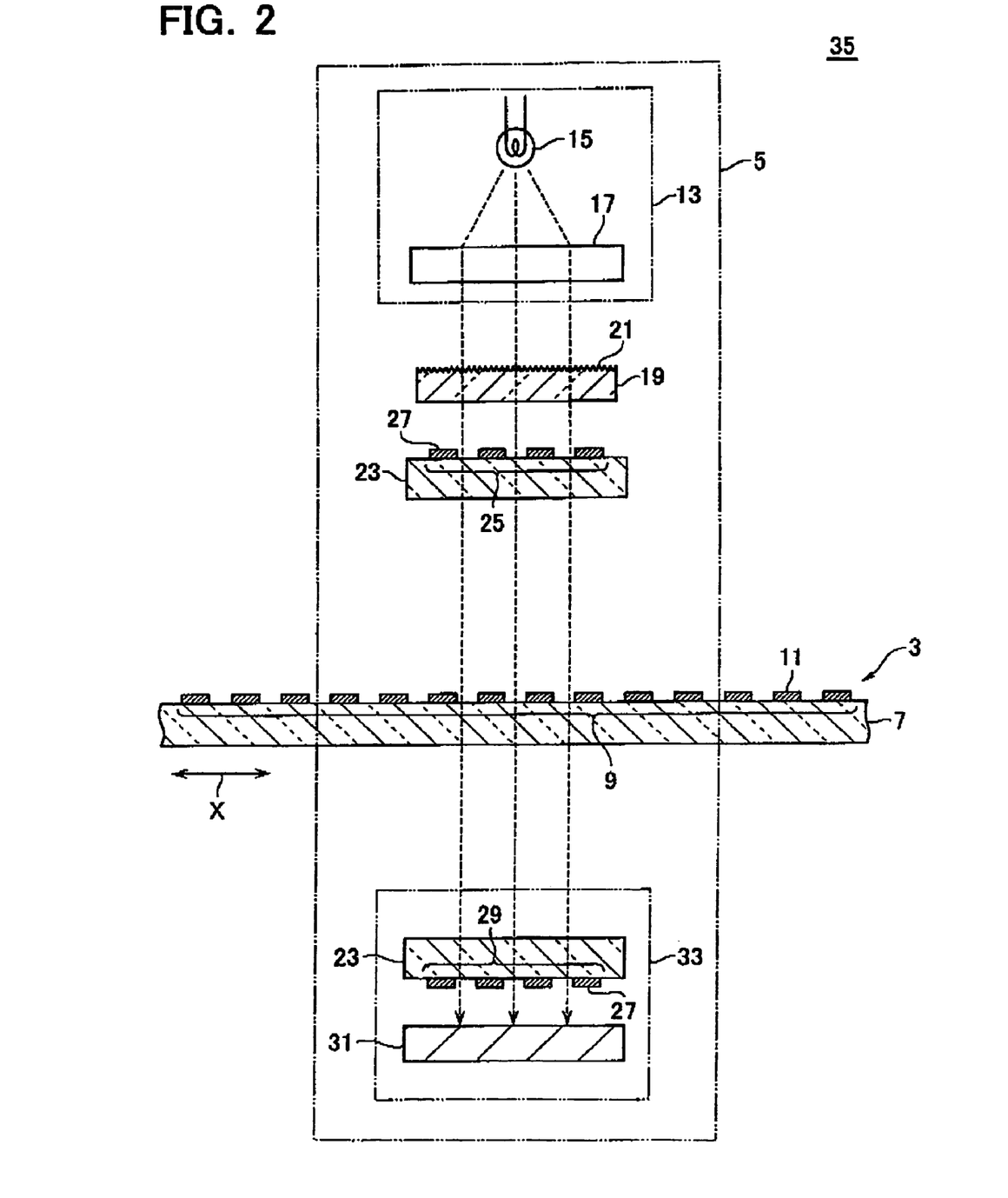
FIG. 2 is a cross-sectional view showing the principle of an optical displacement-measuring instrument of the transmission type according to the embodiment.

The optical displacement-measuring instrument 1 in FIG. 1 is of the reflection type that reflects light at the second optical grating 9 on the scale 3. To the contrary, this embodiment is applicable to the so-called transmission type (that transmits light through the second optical grating on the scale). FIG. 2 is a cross-sectional view showing the principle of an optical displacement-measuring instrument 35 of the transmission type according to the embodiment, and corresponds to FIG. 1.

The following description is given to a difference between the instrument 35 of FIG. 2 and the instrument 1 of FIG. 1. In the instrument 35, the light source 13, the light diffuser 19 and the first optical grating 25 are arranged at locations facing one surface of the scale 3, and the photoreceptor 33 is arranged at a location facing the other surface of the scale 3. The light source 13 is arranged such that the collimated light emitted from the light source 13 in the instrument 35 is radiated to the scale 3 in the vertical direction.

Figure 3:
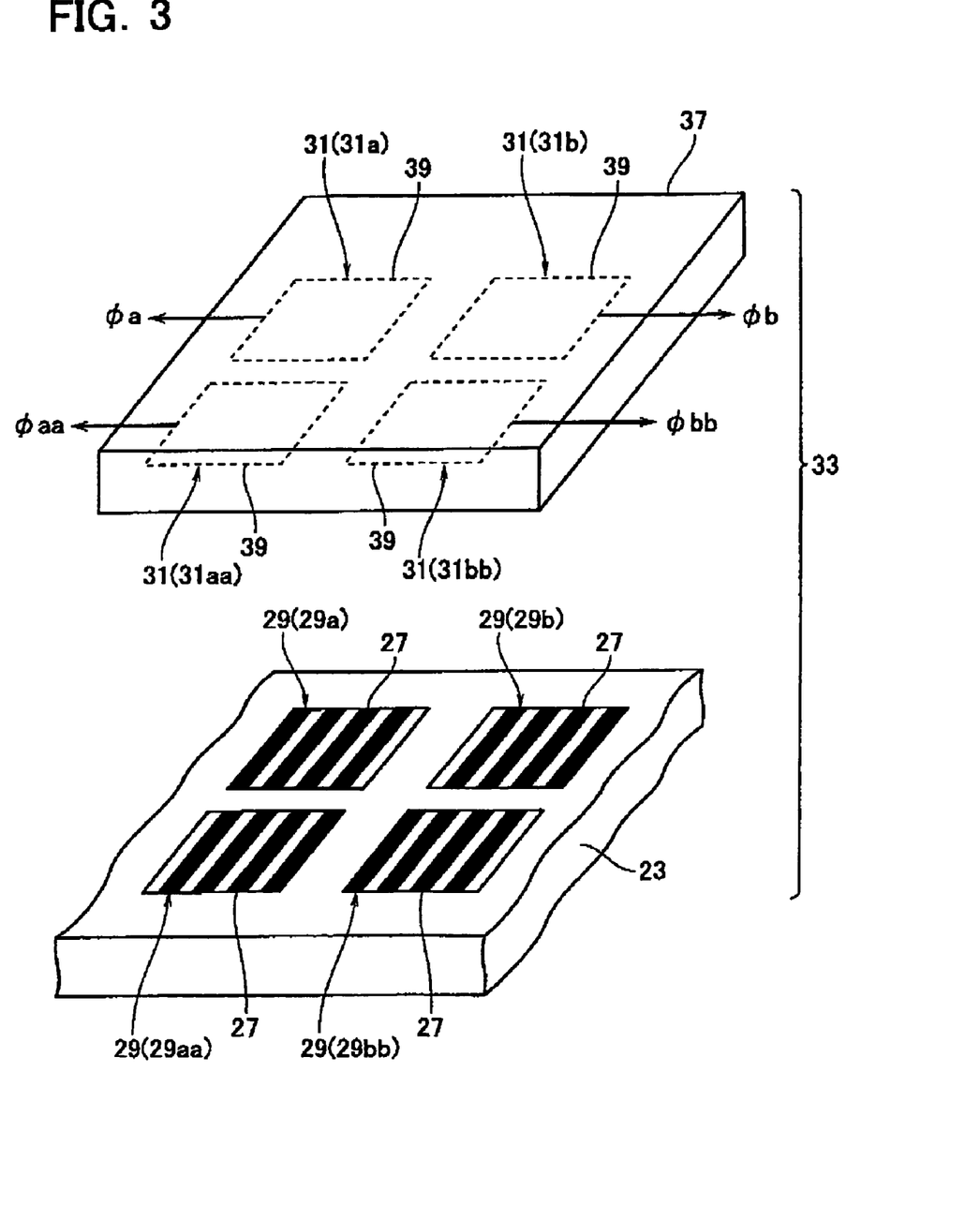
FIG. 3 is an exploded perspective view of an example of the photoreceptor according to the embodiment.

FIG. 3 is employed next to describe a configuration of the photoreceptor 33 in detail. FIG. 3 is an exploded perspective view of the photoreceptor 33. There are provided four third optical gratings 29. These gratings have defined pitches such that the third optical grating 29a has a phase space of 0 degree, the third optical grating 29b has a phase space of 90 degrees, the third optical grating 29aa has a phase space of 180 degrees, and the third optical grating 29bb has a phase space of 270 degrees.

In response to the four third optical gratings 29, there are provided four photodiodes 31. The photodiode 31a opposes to the third optical grating 29a, and the photodiode 31b (31aa, 31bb) opposes to the third optical grating 29b (29aa, 29bb). The photodiodes 31 are each formed with a p-type silicon substrate 37 and an n-type impurity region 39 formed in the upper surface of the substrate (the upper surface facing the light transmissive substrate 23).

The following description is given to a measuring operation in the optical displacement-measuring instrument 1 shown in FIG. 1. While the collimated light L2 is emitted from the light source 13, the sensor head 5 is moved along the measurement axis x above the scale 3 to measure a displacement. The collimated light L2 is led to the light diffuser 19 where it is diffused and turned into a light L3. The light L3 is radiated to the first optical grating 25 where it is diffracted and turned into a light L4. The light L4 is radiated to the second optical grating 9. The radiated light L4 is diffracted and directed to the sensor head 5 as a reflected light L5. The lights L4 and L5 are both adjusted to have an angle $\theta=45°$ from a reference line normal to the scale 3.

The reflected light L5 creates interference fringes on the surface of the third optical grating 29. The interference fringes of light are led to the third optical grating 29a shown in FIG. 3 and then received at the photodiode 31a for photoelectric conversion to output an electric signal from the diode 31a. This signal is represented as an output signal $\phi a$. Similarly, in response to the reflected light L5 led to the third optical grating 29b (29aa, 29bb) and received at the photodiode 31b (31aa, 31bb), an electric signal is output from the diode 31b (31aa, 31bb). This signal is represented as an output signal $\phi b$ ($\phi aa$, $\phi bb$).

The output signal $\phi a$ is a signal of a-phase (0 degree). The output signal $\phi b$ is a signal of b-phase (90 degrees) with a phase shift of 90 degrees from a-phase. The output signal $\phi aa$ is a signal of aa-phase (180 degrees) with a phase shift of 180 degrees from a-phase. The output signal $\phi bb$ is a signal of bb-phase (270 degrees) with a phase shift of 270 degrees from a-phase. The output signals $\phi a$, $\phi b$, $\phi aa$, $\phi bb$ are subjected to processing such as synthesization and interpolation to generate pulses, which are counted to determine the amount of displacement.

The signals of a-phase and b-phase are utilized to determine if the direction of movement of the sensor head 5 is forward or reverse based on the fact that the first detected is a-phase or b-phase. The use of aa-phase and bb-phase, or the inverses of a-phase and b-phase, in addition to a-phase and b-phase, is intended to remove DC components contained in the signals of a-phase and b-phase and ensure the reliability and high-speed following ability of the signals.

This embodiment has a primary characteristic in that the light diffuser 19 is arranged between the light source 13 and the first optical grating 25 as shown in FIGS. 1 and 2. A consequent effect is described. For understanding of this effect, the following description is given first to a problem caused by undulations on the scale and a problem caused by a smaller gap between the optical gratings (the gap between the first and second optical gratings and the gap between the third and second optical gratings).

Figure 4:
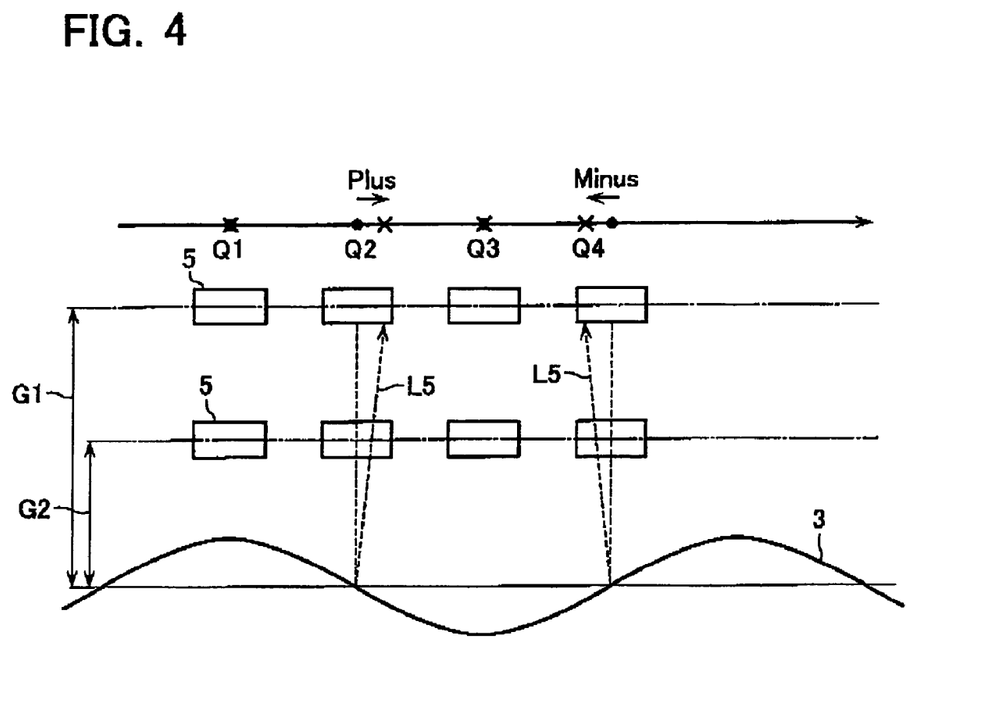
FIG. 4 shows a relation between positions of a scale and a sensor head in the embodiment.

The problem caused by undulations on the scale is described first. FIG. 4 shows a relation between positions of the scale and the sensor head in the embodiment. If the scale 3 has undulations, the reflected light L5 from the second optical grating on the scale 3 is given different angles depending on locations on the scale 3. This means that a deflection arises at a location on the scale 3 to be detected by the sensor head 5. Specifically, no deflection arises at points Q1 and Q3 on the scale 3 and a plus deflection arises at a point Q2 and a minus deflection arises at a point Q4. These deflections prevent precise measurements of displacement.

FIG. 4 shows a situation when the gap between the scale 3 and the sensor head 5, or the gap between the optical gratings, is equal to G1, and a situation when the gap is equal to G2 that is smaller than G1. As obvious from these situations, the smaller the gap between the optical gratings can be made, the smaller the deflection can be controlled.

Figure 5:
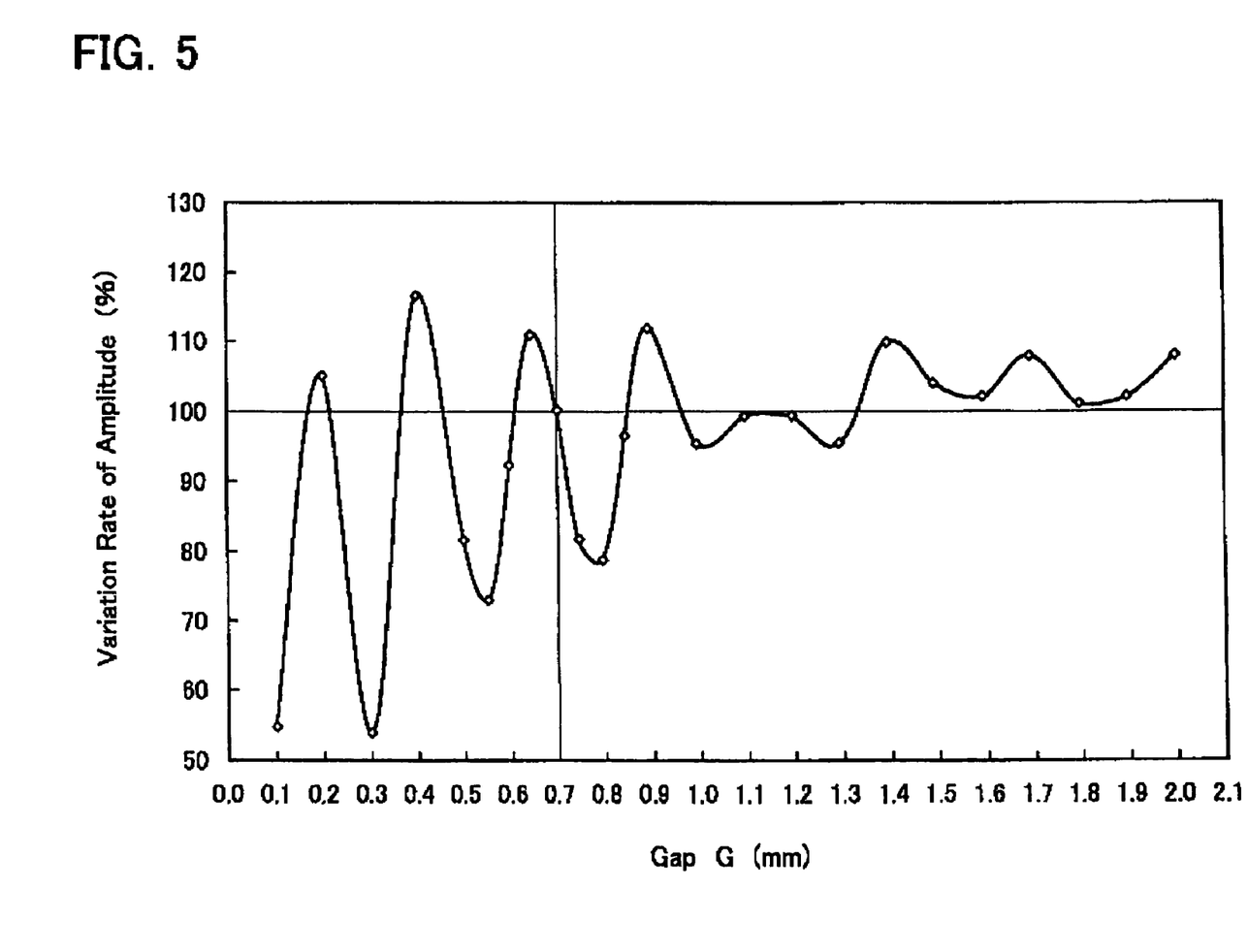
FIG. 5 is a graph showing the variation rate of amplitude of an output signal from a photodiode when no light diffuser is arranged (comparative example)

The smaller the gap between the optical gratings is made, however, the larger the fluctuations arise on the variation rate of amplitude of an output signal. This problem is described below. The variation rate of amplitude is defined as a proportion of the variation in output signal to the variation in gap, where a certain output signal at the design gap (0.7 mm in the graph of FIG. 5) is given 100%. FIG. 5 is a graph showing the variation rate of amplitude of the output signal $\phi a$ provided from the photodiode 31a when the light diffuser 19 is not arranged (comparative example). As the output signals $\phi b$, $\phi aa$, $\phi bb$ have similar graphs, the output signal $\phi a$ is typically described.

The vertical axis indicates the variation rate of amplitude (%). The lateral axis indicates the gap G (mm) between the scale 3 and the light transmissive substrate 23. The light transmissive substrate 23 has a thickness of 0.5 mm. Accordingly, the gap between the optical gratings, or the gap between the first optical grating 25 (the third optical grating 29) and the second optical grating 9, comes to G (mm)+0.5 mm.

If the gap G is larger than 1.0 mm (the gap between the optical gratings is larger than 1.5 mm), the fluctuations of the variation rate of amplitude of the output signal $\phi a$ can be suppressed. To the contrary, if the gap G is equal to 1.0 mm or below, relatively large fluctuations of the variation rate of amplitude of the output signal $\phi a$ arise. The fluctuations of the variation rate of amplitude of the output signal $\phi a$ may cause an error in the measured value of displacement. Therefore, even if the gap between the optical gratings can be made larger compared to the two-grating type, the alignment is difficult (the alignment characteristic is worse) because the tolerance of deflection from the design value of the gap is narrow.

Figure 6:
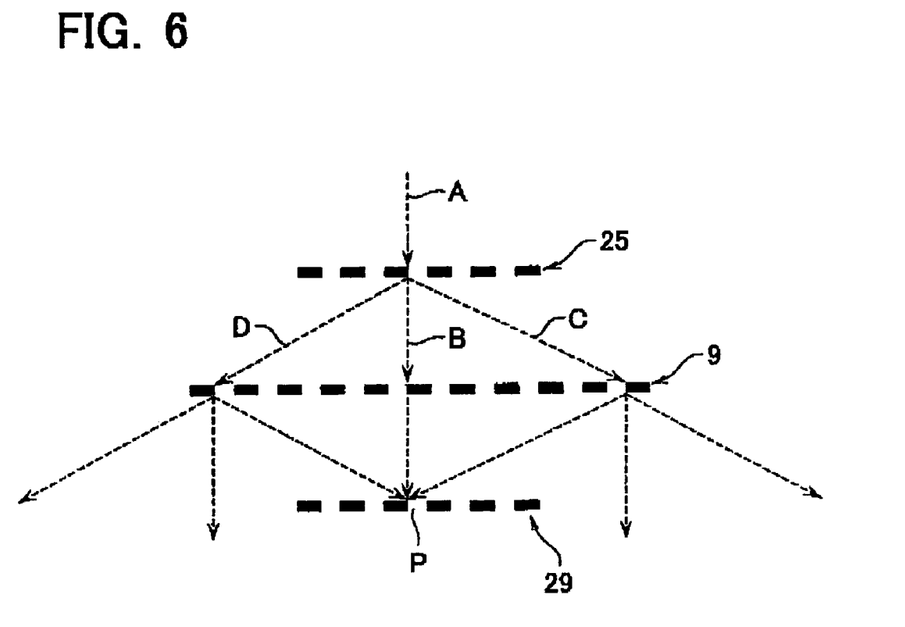
FIG. 6 shows interference caused by a higher-order diffracted light in the comparative example.

Interference with plus/minus ($\pm$) tertiary or higher-order diffracted lights may be considered to cause relatively large fluctuations of the variation rate of amplitude of the output signal $\phi a$. FIG. 6 shows interference with higher-order diffracted lights. Incidence of a collimated light A to the first optical grating 25 generates a zero-order diffracted light B and others such as plus/minus primary diffracted lights and higher-order diffracted lights (plus/minus tertiary diffracted lights C, D). For measurement of displacement, the zero-order diffracted light and the plus/minus primary diffracted lights are utilized but higher-order diffracted lights are not utilized.

If the gap between the first optical grating 25 and the second optical grating 9 is relatively large, the plus/minus tertiary diffracted lights C, D can advance without incidence to the second optical grating 9. In contrast, if the gap is relatively small, the plus (+) tertiary diffracted light C and the minus (−) tertiary diffracted light D enter the second optical grating 9 where they are diffracted. In this case, some diffracted light may enter the point P of incidence of the zero-order diffracted light B on the third optical grating 29 to interfere with the zero-order diffracted light B. Interference with higher-order diffracted lights may be considered to cause relatively large fluctuations of the variation rate of amplitude of the output signal φa where the gap G is equal to 1.0 mm or below in FIG. 5. The description is given in FIG. 6 to the three gratings of the transmission type though it may be similarly given to three gratings of the reflection type.

Accordingly, if the gap G is made larger than 1.0 mm (the gap between the optical gratings is made larger than 1.5 mm) in the three-grating type, the interference with the higher-order diffracted lights can be prevented. As a result, the fluctuations of the variation rate of amplitude of the output signal can be suppressed. This means that the tolerance of deflection from the design value of the gap is large. Thus, the alignment during assembly of the optical displacement-measuring instrument can be made easier (an improved alignment characteristic).

Figure 7:
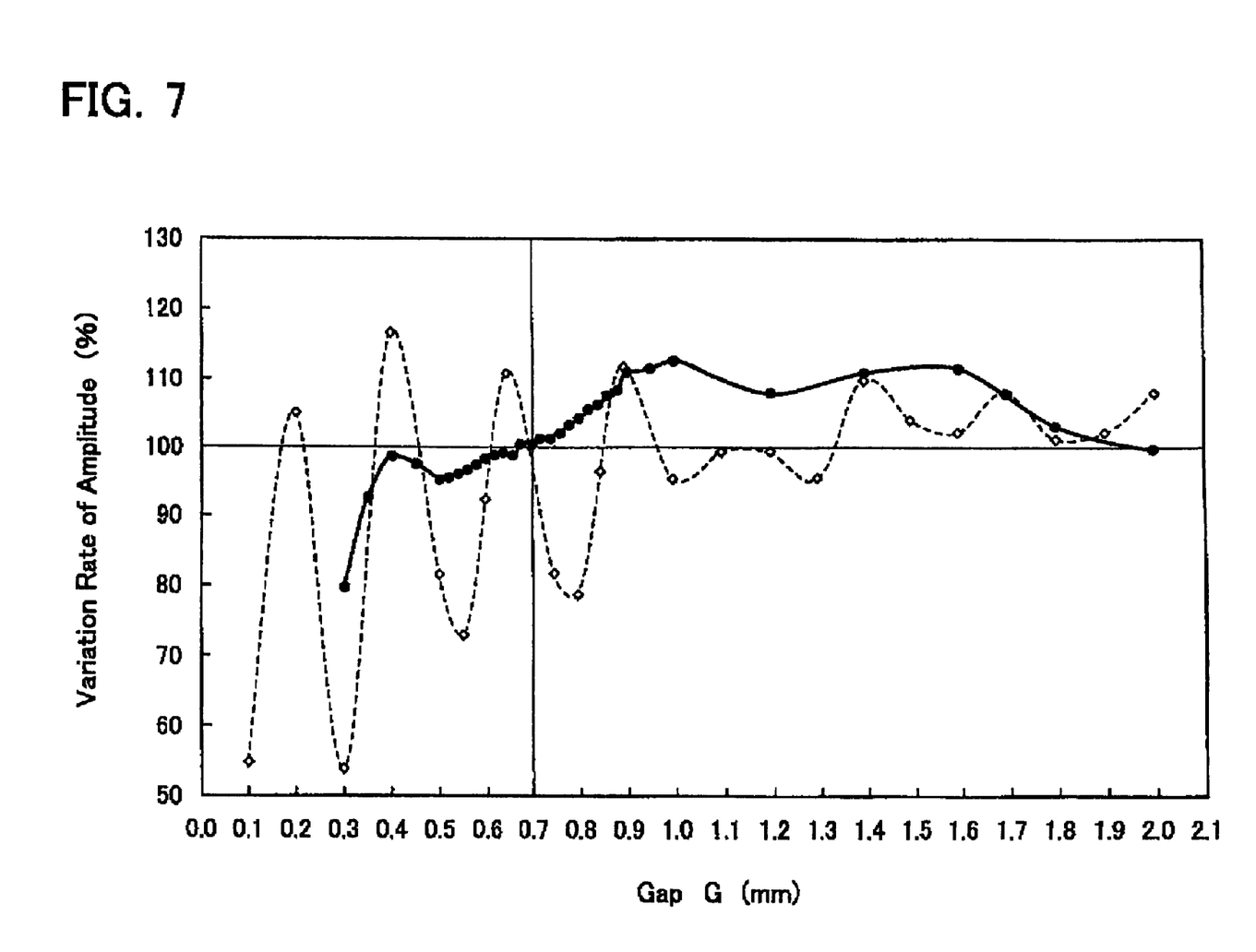
FIG. 7 is a graph showing an example of the variation rate of amplitude of an output signal from a photodiode in the embodiment.
Figure 8:
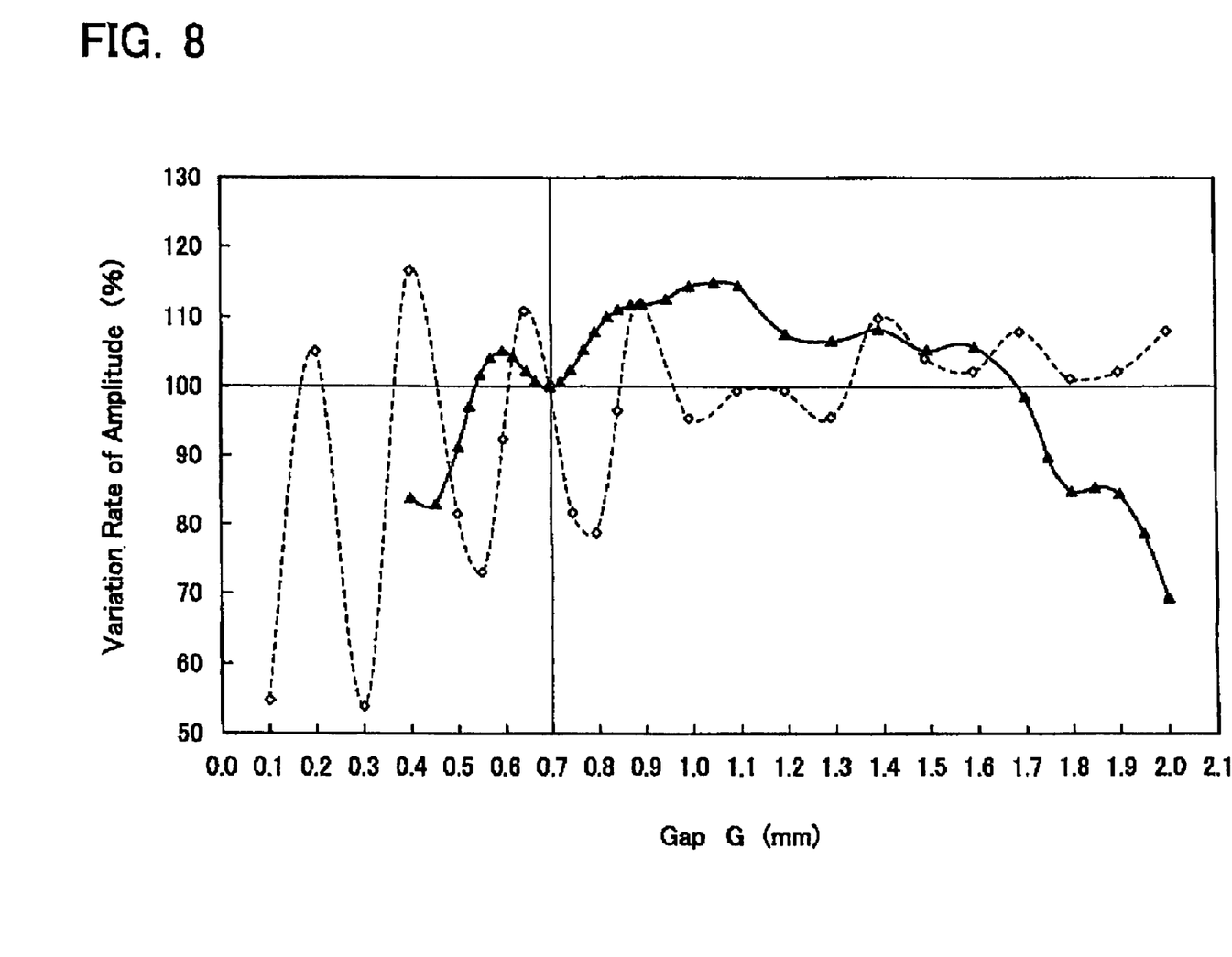
FIG. 8 is a graph showing another example of the variation rate of amplitude of an output signal from a photodiode in the embodiment.

If the gap between the optical gratings is made larger, however, the above-described problem associated with the undulations on the scale arises. To the contrary, in the embodiment, even if the gap G is made smaller (for example, 1.0 mm or below), the fluctuations of the variation rate of amplitude of the output signal can be suppressed as shown in FIGS. 7 and 8. FIGS. 7 and 8 are graphs showing the variation rates of amplitude of the output signal φa provided from the photodiode in the embodiment and correspond to FIG. 5. FIG. 7 graphs a situation when a light diffusive plate is employed as the light diffuser 19. FIG. 8 graphs a situation when a prism (a diffusive sheet for back light in LCD such as a prism sheet) is employed as the light diffuser 19. The solid line shows data on the embodiment and the dotted line shows data on the comparative example of FIG. 5.

In the embodiment the light diffuser 19 is arranged between the light source 13 and the first optical grating 25. Accordingly, even if the gap G is made smaller (1.0 mm or below), the fluctuations of the variation rate of amplitude of the output signal can be suppressed for the following assumed reason.

In comparison with a diffused light, a collimated light is higher in intensity and accordingly easier to cause higher-order diffracted lights. Therefore, as described with reference to FIG. 5, the smaller the gap between the optical gratings is made, the larger the fluctuation of the variation rate of amplitude of the output signal is made. To the contrary, when the collimated light is diffused as is in the embodiment, generation of higher-order diffracted lights can be suppressed. In a word, when the optical displacement-measuring instrument includes a light emitting element capable of emitting a coherent light (such as a laser and a light emitting diode), an interference characteristic having a period of $(np^2/\lambda)$ logically appears on amplitude of the output signal from the photoreceptor. In this case, p denotes a pitch of an optical grating on the scale (the second optical grating). λ denotes a wavelength of light emitted from the light emitting element, and n is an integer. In the embodiment the light emitted from the laser or the light emitting diode is made incoherent at the light diffuser to suppress the above interference characteristic.

The use of a light source capable of providing a diffused light may prevent generation of higher-order diffracted lights though such the light source can not concentrate light sufficiently for radiation of the scale. This causes a problem because the current consumed in the light emitting diode is increased to achieve the amount of light required for measurement of displacement. When the light source configured to provide the collimated light is employed together with the light diffuser as is in the embodiment, it is possible to lower the current consumed in the light emitting diode and suppress the higher-order diffracted lights.

As described above, even if the gap G is made smaller (for example, 1.0 mm or below, or 1.5 mm or below when converted into the gap between the optical gratings), fluctuations of the variation rate of amplitude of the output signal can be suppressed In the embodiment. Therefore, the tolerance of deflection from the design value of the gap between the optical gratings can be increased to improve the alignment characteristic. Thus, it is possible to reduce the time required for assembling the optical displacement-measuring instrument.

Figure 9:
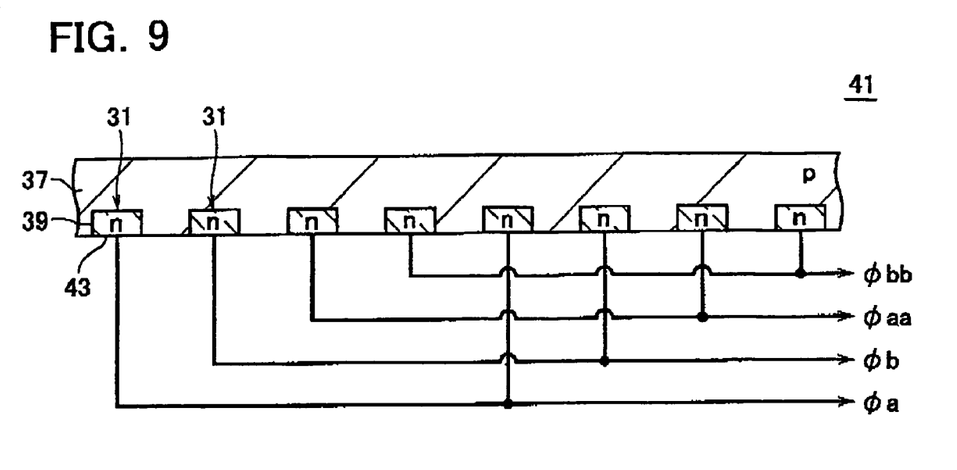
FIG. 9 is a cross-sectional view of another example of the photoreceptor according to the embodiment.

While the photoreceptor 33 shown in FIG. 3 comprises the third optical grating 29 and the photodiodes 31, another example of the photoreceptor is also available in the embodiment as described below. FIG. 9 is a cross-sectional view of another example of the photoreceptor. The photoreceptor 41 is configured to include a plurality of photodiodes 31 divided for different phases, which are arranged in array along the measurement axis such that the photodiodes 31 of the same phase are arranged periodically. Therefore, the photoreceptor 41 includes the photodiodes 31 arranged for φa, φb, φaa, φbb, φa, φb . . . in turn. The photodiodes 31 have photoreceptive surfaces 43 that also serve as the third optical grating. Accordingly, it is not required to provide the third optical grating separately.

Figure 10:
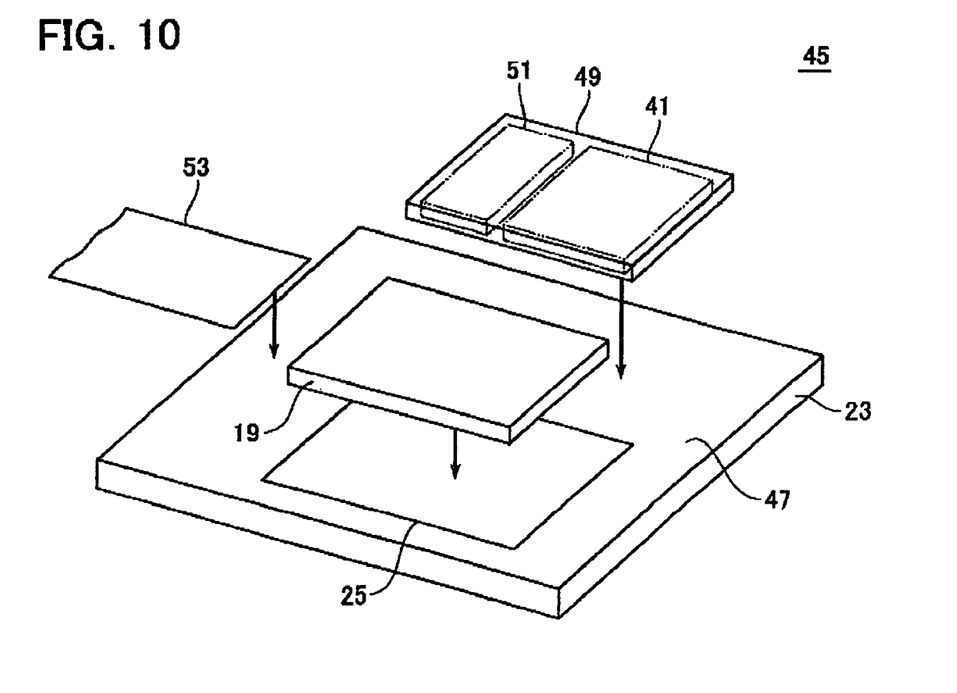
FIG. 10 is an exploded perspective view of an optical module including a first example of the light diffuser according to the embodiment.

Finally, a specific example of the light diffuser available in the embodiment is described. FIG. 10 is an exploded perspective view of an optical module that includes a beam shaping diffuser as a first example of the light diffuser. The optical module 45 comprises the light transmissive substrate 23, which is a COG (Chip on Glass) substrate. The light transmissive substrate 23 has an upper surface 47, on which the first optical grating 25 (the structure of the grating 25 is omitted) and wires, not shown, are formed.

The light diffuser 19 is arranged on the first optical grating 25. A semiconductor chip 49 is arranged on the upper surface 47 of the light transmissive substrate 23. The semiconductor chip 49 includes the photoreceptor 41 shown in FIG. 9 and an operation unit 51 that amplifies and synthesizes the output signals from the photoreceptor 41. The wires formed on the upper surface 47 are electrically connected to a FPC wire 53.

Figure 11:
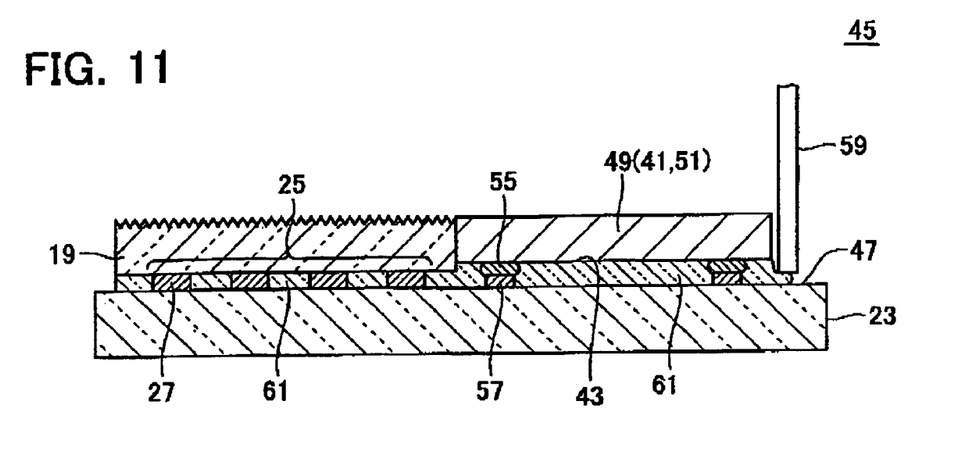
FIG. 11 shows a step of assembling the optical module according to the embodiment.

FIG. 11 is a cross-sectional view showing a step of assembling the optical module 45. First, a process of flip-chip bonding is applied to attach the semiconductor chip 49 to the light transmissive substrate 23. (Specifically, the photoreceptive surface 43 of the photoreceptor 41 is faced to the light transmissive substrate 23 to connect bump electrodes 55 on the semiconductor chip 49 to wires 57 on the light transmissive substrate 23.) Then, the light diffuser 19 is mounted on the first optical grating 25. An underfill material 61 is injected through a nozzle 59 into the gap between the semiconductor chip 49 and the light transmissive substrate 23. The underfill material 61 also flows into the gap between the light diffuser 19 and the light transmissive substrate 23. The underfill material 61 is then thermally cured. As a result, the underfill material 61 is filled in the gap between the semiconductor chip 49 and the light transmissive substrate 23, and the light diffuser 19 is fixed on the light transmissive substrate 23 at the same time.

As described with reference to FIGS. 10 and 11, the step of filling the underfill material 61 in the gap between the semiconductor chip 49 and the light transmissive substrate 23, and the step of fixing the light diffuser 19 on the light transmissive substrate 23 can be performed at the same time in the embodiment. Accordingly, it is possible to simplify the process steps of manufacturing the optical module 45, that is, the optical displacement-measuring instrument.

The light diffuser may be formed on the first optical grating 25 through a process of film formation. For example, a coating material (such as a silicone resin) containing glass beads or opaque beads (such as silicone beads) mixed and agitated therein may be employed as a material for the film formation.

Figure 12:
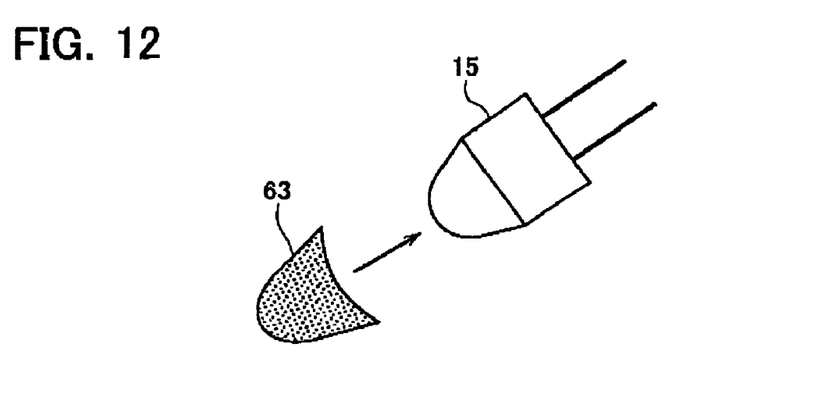
FIG. 12 shows a second example of the light diffuser according to the embodiment.

FIG. 12 shows a second example of the light diffuser. This light diffuser 63 is shaped in a cap and covered on the light emitting diode 15. The light diffuser 63 is fixed to the light emitting diode 15 using an adhesive or an underfill material. The light diffuser 63 may be formed using a vacuum injection mold.

Figure 13:
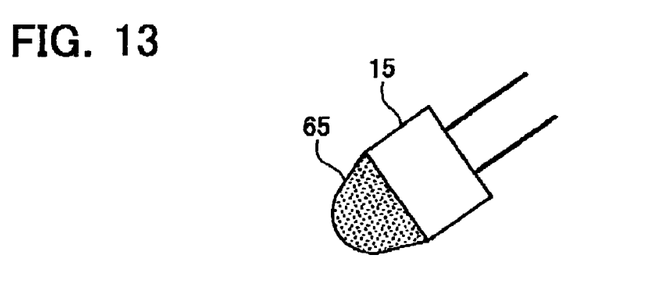
FIG. 13 shows a third example of the light diffuser according to the embodiment.

FIG. 13 shows a third example of the light diffuser. The light emitting diode 15 has a lens having projections and recesses formed thereon, which are employed as the light diffuser 65. The projections and recesses can be formed through the use of a sandblast or the like to scrape the surface of the lens.

The optical displacement-measuring instrument according to the present invention is capable of increasing the tolerance of deflection from the design value of the gap between the optical gratings. Thus, it can make the alignment during assembly of the optical displacement-measuring instrument easier (provide an improved alignment characteristic).

What is claimed is:

1. An optical displacement-measuring instrument, comprising:
    a light source configured to provide a collimated light;
    a light diffuser arranged to diffuse said collimated light from said light source;
    a first optical grating arranged to diffract a diffused light from said light diffuser;
    a scale having a second optical grating arranged opposite to said first optical grating to diffract a diffracted light from said first optical grating; and
    a photoreceptor movable together with said light source, said light diffuser and said first optical grating relative to said scale and having a third optical grating arranged opposite to said second optical grating to receive a diffracted light from said second optical grating, wherein said first and second gratings have a gap of 1.0 mm or less therebetween, and said third and second optical gratings have a gap of 1.0 mm or less therebetween.

2. The optical displacement-measuring instrument according to claim 1, wherein said light diffuser includes a light diffusive plate.

3. The optical displacement-measuring instrument according to claim 1, wherein said light diffuser includes a prism.

4. The optical displacement-measuring instrument according to claim 1, further comprising:
    a semiconductor chip including said photoreceptor being attached by flip-chip bonding to a light transmissive substrate; and
    an underfill material arranged to fill a gap between said semiconductor chip and said light transmissive substrate and to fix said light diffuser on said light transmissive substrate.

5. An optical displacement-measuring instrument, comprising:
    a light source configured to provide a collimated light;
    a light diffuser arranged to diffuse said collimated light from said light source;
    a first optical grating arranged to diffract a diffused light from said light diffuser;
    a scale having a second optical grating arranged opposite to said first optical grating to diffract a diffracted light from said first optical grating;
    a photoreceptor movable together with said light source, said light diffuser and said first optical grating relative to said scale and having a third optical grating arranged opposite to said second optical grating to receive a diffracted light from said second optical grating; and
    a light transmissive substrate arranged to support said first and third optical gratings at locations facing one surface of said scale,
    wherein said first and second optical gratings have a gap of 1.5 mm or less therebetween, and said third and second optical gratings have a gap of 1.5 mm or less therebetween.

* * * * *